United States Patent [19]

Kovach

[11] Patent Number: 4,732,768

[45] Date of Patent: Mar. 22, 1988

[54] SPONGE DOUGH PROCESS

[75] Inventor: Nickolas C. Kovach, Kansas City, Mo.

[73] Assignee: Interstate Brands Corporation, Kansas City, Mo.

[21] Appl. No.: 911,050

[22] Filed: Sep. 23, 1986

[51] Int. Cl.$^4$ .............................................. A21D 8/02
[52] U.S. Cl. ....................................... 426/27; 426/19; 426/24
[58] Field of Search ............................ 426/27, 19, 24

[56] References Cited

U.S. PATENT DOCUMENTS

| | | | |
|---|---|---|---|
| 3,429,712 | 2/1969 | Turner | 426/24 X |
| 3,464,829 | 9/1969 | Geminder et al. | 426/24 |
| 3,535,120 | 10/1970 | Bouchard et al. | 426/19 |
| 3,536,497 | 10/1970 | Jackel | 426/19 |
| 3,552,977 | 1/1971 | Bouchard et al. | 426/24 |
| 3,556,804 | 1/1971 | Conn et al. | 426/19 |
| 3,870,799 | 3/1975 | Tenney | 426/24 X |
| 3,900,570 | 8/1975 | Stigler | 426/24 X |
| 4,399,155 | 8/1983 | Forsythe | 426/24 |

OTHER PUBLICATIONS

Pyler, Baking Science & Technology, 1973, vol. II, Siebel Publ. Co.: Chicago, pp. 586-651, 1036-1037.

Primary Examiner—Joseph Golian
Attorney, Agent, or Firm—Schmidt, Johnson, Hovey & Williams

[57] ABSTRACT

An improved process for producing baked products such as breads and rolls is provided which gives the products an extremely long shelf life and essential batch-to-batch uniformity. Moreover, the process is susceptible to a high degree of automation, thereby lowering costs. Broadly speaking, the process of the invention is an improvement over conventional sponge methods and involves initially setting the sponge fraction at a temperature of about 72°-80° F. and a pH of 5.2-5.6; the sponge is fermented for a period of about 1½-2½ hours in order to elevate the temperature and reduce the pH of the sponge. The sponge is then cooled to eliminate yeast activity, and is mixed with dough fraction components to yield a final dough. The final mixed dough is quiescently held and proofed in an intermediate proofer for 6-8 minutes. Final processing involves molding, baking, cooling and packaging. The process is also characterized by a complete absence of synthetic yeast foods in the sponge fraction.

8 Claims, 1 Drawing Figure

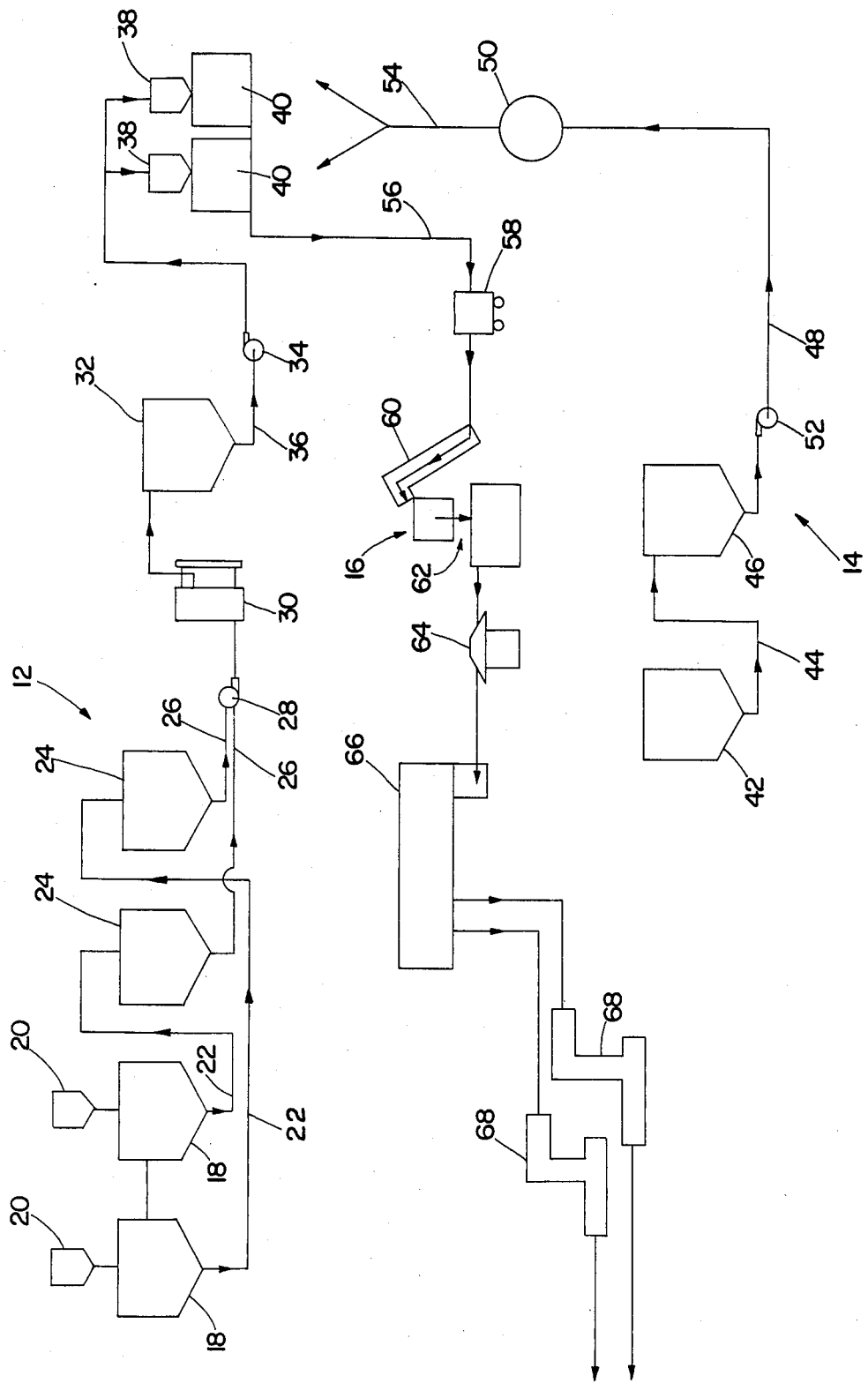

SPONGE DOUGH PROCESS

BACKGROUND OF THE INVENTION

1. Field of the Invention

The present invention is broadly concerned with an improved baking process of the sponge dough type which yields final baked products having a high degree of uniformity coupled with extremely long shelf lives. More particularly, it is concerned with such a sponge dough baking process which combines a number of relatively critical processing steps, particularly in the treatment of the sponge fraction, to give significantly improved bread products such as bread and rolls.

2. Description of the Prior Art

The sponge dough process has long been used by commercial bakers in the preparation of white and varietal bread products (e.g., white breads and rolls, crisp tops, honey wheats, ryes and pumpernickels). In the case of standard white breads for example, the typical sponge dough process involves separate preparation of a yeast-containing sponge fraction and a corresponding flour-based dough fraction. Generally speaking, the sponge fraction includes a substantial proportion of the total flour content of the resultant baked product, typically on the order of 80% by weight. After the sponge is initially mixed, it is allowed to ferment, usually for a period of from 3 to 4½ hours until the sponge rises and falls. Thereafter, the sponge is normally allowed to stand for about 20 minutes to allow maximum development of the sponge and the gluten therein. The sponge is then mixed with the dough fraction to produce a final dough. This final dough is then normally divided, rounded, molded and baked.

While sponge dough processes of the type described are well known, and the products resulting therefrom are of generally high quality, a number of problems still remain. In particular, commercial bakers are always interested in extending the shelf life of their baked products, inasmuch as long shelf times reduce costs and returned products. Generally speaking, typical white breads have a shelf life of only three to five days.

Another problem faced by commercial bakers is that their baked products may vary from batch to batch. This can be a significant drawback, because consumers have come to expect very consistent qualities in commercial bakery products, and will reject those which look or feel different, even though the breads may be perfectly acceptable from a nutritional point of view.

There is thus a decided need in the art for an improved sponge dough process yielding essentially identical and equivalent products in successive batches, while giving significantly enhanced resistance to staling and correspondingly longer shelf lives.

SUMMARY OF THE INVENTION

The present invention overcomes the problems noted above and provides a greatly improved sponge dough baking process for the production of a wide variety of baked good characterized by essential uniformity and extended shelf lives. The process of the invention is an improvement over the conventional sponge process and involves relatively critical control of a number of dough processing steps, particularly those involving the sponge fraction.

In the process of the invention, separate sponge and dough fractions are prepared, with the sponge fraction containing yeast. In sharp contrast to conventional methods, the sponge fraction of the present invention contains a lower percentage of flour, on the order of from about 50 to 60% by weight of the total flour content of the final dough produced by the admixture of the sponge and dough fractions. Most preferably, the sponge fraction will contain about 50% of the total flour content of the final dough. In addition, the sponge fraction of the present invention is free of synthetic yeast foods such as ammonium sulfate. Natural yeast foods such as sugar may be and typically are present in the sponge, but there is a complete avoidance of synthetic foods which can generate undue oxygen.

Initial mixing of the sponge ingredients is carried out in such manner as to give the sponge specific set conditions, and in particular the sponge should have a temperature of from about 72° to 80° F. (more preferably from about 74°–78° F.), and a pH of from about 5.2 to 5.6 (more preferably from about 5.4 to 5.6).

The sponge in this initially set condition is then subjected to a relatively short fermentation period of from about 1½ to 2½ hours, and most preferably about 2 hours. Fermentation is carried out in closed tank(s) of sanitation reasons.

The fermentation is carried out so that yeast activity will begin and the volume of the sponge will increase due to carbon dioxide gas resulting from yeast action. This conditions and mellows the gluten, and the latter moreover becomes elastic as the result of the effect of alcohol and lowered acidity in the sponge. In any event, the fermentation is carried out under conditions such that at the end of the period the sponge has a temperature of about 82° to 84° F. and a reduced pH (preferably by a factor of at least 1/10 of a pH unit) as compared with the initial set pH. pH control at this stage may be altered by the addition of calcium carbonate.

The fermented sponge fraction is then cooled by passing it through a heat exchanger to eliminate yeast activity, whereupon the cooled sponge is directed to a holding tank. The sponge is cooled to a temperature of from about 40° to 45° F., and is held for variable periods of time. This holding period is not critical and serves as a convenient manner of accumulating sponge to maintain continuity in baking operations.

The sponge fraction after holding is then mixed with a liquid dough fraction, flour and salt, in order to yield the final dough. This final dough is then quiescently held in a dough trough for a period of from about 15 to 30 minutes, and most preferably for a period of about 20 minutes. This holding period is referred to in the art as "floor time."

After the floor time has elapsed, the final dough is conventionally divided and rounded, and is then sent to an overhead proofer for an intermediate proofing step. This proofing is carried out for a period of from about 6 to 8 minutes in a closed proofer. The proofed dough is then subjected to a mechanical molding operation, whereupon the molded dough pieces are finally proofed, baked, cooled and wrapped. Such steps of molding, final proofing, baking, cooling and wrapping are all entirely conventional and within the skill of the art.

The final baked products of the invention exhibit extended shelf lives on the order of seven days or more. Actual testing has demonstrated that such products have the same softness and compressibility after seven days as normal white bread at the end of three days. Moreover, the products are very consistent batch-tobatch in terms of desirable organoleptic properties (e.g., appearance, flavor and softness). Finally, the process of the invention is more susceptible to automation and large scale operations, thus reducing costs.

BRIEF DESCRIPTION OF THE DRAWING

The single FIGURE is a schematic flow diagram illustrating a commercial sponge dough bread making plant and process in accordance with the invention.

DESCRIPTION OF THE PREFERRED EMBODIMENT

Turning now to the drawing, a commercial bread production line 10 using the improved sponge dough process of the invention is illustrated. The production line 10 broadly includes a sponge fraction line 12, a dough fraction slurry line 14, and a final dough line 16.

The sponge fraction line 12 includes one or more sponge makeup tanks 18 having conventional flour scales 20 associated therewith. The tanks 18 are coupled via conduits 22 to respective closed-top sponge fermentation tanks 24. The latter are coupled via conduits 26 to a dough pump 28. Pump 28 is in turn connected to an indirect cooling heat exchanger 30 using refrigerated water as a coolant. The outlet of exchanger 30 is directed to the inlet of a sponge holding tank 32. Tank 32 is coupled to another dough pump 34 via conduit 36, the latter leading to sponge scale tanks 38. The tanks 38 are operatively connected to dough mixers 40.

The dough fraction line 14 includes a dough slurry makeup tank 42 coupled via a conduit 44 with a downstream dough slurry holding tank 46. A conduit 48 is coupled between tank 46 and a motion meter 50, and has a slurry pump 52 interposed therein. A branched conduit 54 is connected between the meter 50 and the respective dough mixers 40, as illustrated.

The final dough line 16 includes a conduit 56 coupled between the outlets of the mixers 40 and a dough trough 58. The dough trough is in turn coupled with a hoist 60 feeding a dough divider apparatus referred to by the numeral 62. A conventional dough rounder 64 is located downstream of the divider apparatus 62, and an overhead proofer 66 receives rounded dough pieces from the rounder 64. Conventional dough molders 68 are located to receive dough pieces subjected to intermediate proofing in the proofer 66. Finally, the molded dough pieces from the molder 68 are subjected to downstream processing involving conventional final proofing, baking, cooling and packaging. Inasmuch as these final steps are entirely within the skill of the art, such apparatus has not been shown in the Figure.

The following exemplary process in accordance with the invention is designed for the production of loaves of white bread. It will be understood that the example is intended to illustrate the principles of the invention, and that accordingly the example should not be considered in a limiting sense.

EXAMPLE

The respective sponge and dough fractions used in the production of white bread loaves contained the following ingredients.

Sponge Fraction

Patent enriched wheat flour: 50 lbs.
Water: 52 lbs.
Emplex[1]: 6 oz.
Soya oil: 4 oz.
Yeast[2]: 3 lbs.
Salt: 4 oz.
HFCS liquid sugar[3]: 2 lbs.
  (Solids): (1 lb. 7 oz.)
  (Water): (9 oz.)
Potassium bromate: 30 ppm

[1] Sodium stearoyl 2-lactylate surfactant sold by C. J. Patterson Co. of Kansas City, Mo.
[2] Any one of a number of commercially available yeasts can be used, such as that commercialized under the name "Red Star."
[3] High fructose corn sugar containing 71% solids and 29% water.

Dough Fraction

Patent enriched wheat flour: 50 lbs.
Water: 4 lbs. 8 oz.
Whey: 2 lbs. 10 oz.
Cultured whey: 6 oz.
Soya oil: 2 lbs. 4 oz.
Salt: 2 lbs.
Panatex[1]: 8 oz.
Calcium sulfate: 8 oz.
Potassium bromate: 30 ppm
Watox[2]: 40 ppm
HFCS liquid sugar: 10 lbs.
  (Solids): (7 lbs. 1 oz.)
  (Water): (2 lbs. 15 oz.)

[1] Panatex is a mixture of mono- and diglycerides used as a softening agent and commercialized by the Panaplus Corp. of Kansas City, Mo.
[2] Watox is azo dicarbonamide used as a gluten relaxant and sold by Cain Industries of Dallas, Tex.

Considering first the preparation of the sponge fraction, all ingredients save for the salt and flour are initially mixed in the tanks 18 to achieve a homogeneous dispersion. At this point the flour is added with mixing to obtain an even mixture. Water temperature is variable depending upon the temperature of the other ingredients, bearing in mind that the goal is to obtain set conditions in the sponge fraction prior to fermentation of from about 74°-78° F., and most preferably 76° F.

The initially mixed sponge is then transferred to the closed top fermentation tanks 24, whereupon it is allowed to ferment for a period of two hours. The fermented sponge from the tanks 24 has a reduced pH typically ranging from about 5.2 to 5.4, and a temperature of from about 82°-84° F.

The fermented sponge is then passed through exchanger 30 in order to reduce the temperature thereof to about 40°-45° F. At this point the sponge is held in closed top tank 32 which serves as an accumulator in order to maintain continuity in baking operations. Indeed, in actual practice it has been found that the sponge can be held within tank 32 at the noted temperature conditions for a relatively long period, even overnight, without adverse results. From the holding tank, the sponge passes into the tanks 38 for mixing with the dough fraction.

The dough fraction is produced by first mixing all components with the exception of salt and flour in the tank 42, whereupon the resultant slurry is passed to tank 46. This slurry is then pumped via pump 52 to the mixers 40. At this stage, the flour of the dough fraction is added to the slurry simultaneously with the sponge fraction from tanks 38. Total mixing time in the mixers 40 normally takes about 10 minutes. At the end of 5 minutes into this mixing period, during the clean up phase, the salt is added to complete the final dough.

The final dough is then directed to dough trough 58 and is allowed to quiescently set for a period of about 20 minutes. Next, the dough is divided and rounded in apparatus 62 and rounder 64, whereupon the rounded dough pieces are sent to an overhead proofer for a period of about 6-8 minutes. Final downstream processing involving final molding, proofing, baking, cooling and packaging are entirely conventional.

Considering again the sponge fraction, the Emplex is present for its surfactant characteristics, whereas the soya oil serves as a softener and a slicing lubricant. The salt is added for flavor and to facilitate gluten recovery. The bromate is an oxidant and increases fermentation rate, whereas the sugar serves as a natural yeast food.

In the case of the dough fraction, the whey and sugar are added for nutritional reasons, whereas the cultured whey product serves as a natural mold inhibitor. The soya oil is a softening agent, facilitates water retention, and serves as a lubricant to ease slicing. The salt is a flavor factor and gluten rejuvenator, whereas the Panatex product increases water retention and softness in the final loaf. The bromate in the dough fraction gives additional gasing power for the final dough.

I claim:

1. In a sponge dough process for preparing a final dough including the steps of preparing a yeast-containing sponge fraction and a dough fraction, initially setting the sponge fraction and allowing it to ferment, mixing the sponge and dough fractions to yield a final dough, and dividing and proofing the final dough, the improvement which comprises the steps of:

preparing said sponge fraction such that the sponge fraction contains from about 40 to 60% by weight of the total flour content of the final dough, and initially setting said sponge fraction at a temperature of from about 72° to 80° F. and a pH of from about 5.2 to 5.6;

fermenting said initially set sponge fraction for a period of from about 1½ to 2½ hours and under conditions such that at the end of the fermentation period the sponge fraction has a temperature of from about 82° to 84° F. and a reduced pH as compared with the initial set pH;

reducing the temperature of the sponge fraction to a level of from about 40° to 45° F.;

mixing said dough fraction and said sponge fraction after the latter has been reduced in temperature to yield said final dough, and thereafter quiescently holding the final dough for a period of from about 15 to 30 minutes; and subjecting the quiescently held final dough to an intermediate proofing step for a period of from about 6 to 8 minutes.

2. The sponge dough process of claim 1, said sponge fraction containing about 50% by weight of the total flour content of said final dough.

3. The sponge dough process of claim 1, said sponge fraction being free of synthetic yeast food.

4. The sponge dough process of claim 1, said initial setting temperature being from about 74° to 78° F.

5. The sponge dough process of claim 1, said initial setting pH being from about 5.4 to 5.6.

6. The sponge dough process of claim 1, said fermentation time being about 2 hours.

7. The sponge dough process of claim 1, the pH of said sponge fraction after said fermentation period being reduced at least about 1/10 pH unit as compared with said initial set pH.

8. The sponge dough process of claim 1, said quiescent holding period of said final dough being for a period of about 20 minutes.

* * * * *